March 23, 1937.  V. E. NELSON  2,074,703
CASING FOR UNIVERSAL JOINTS
Filed Sept. 15, 1934
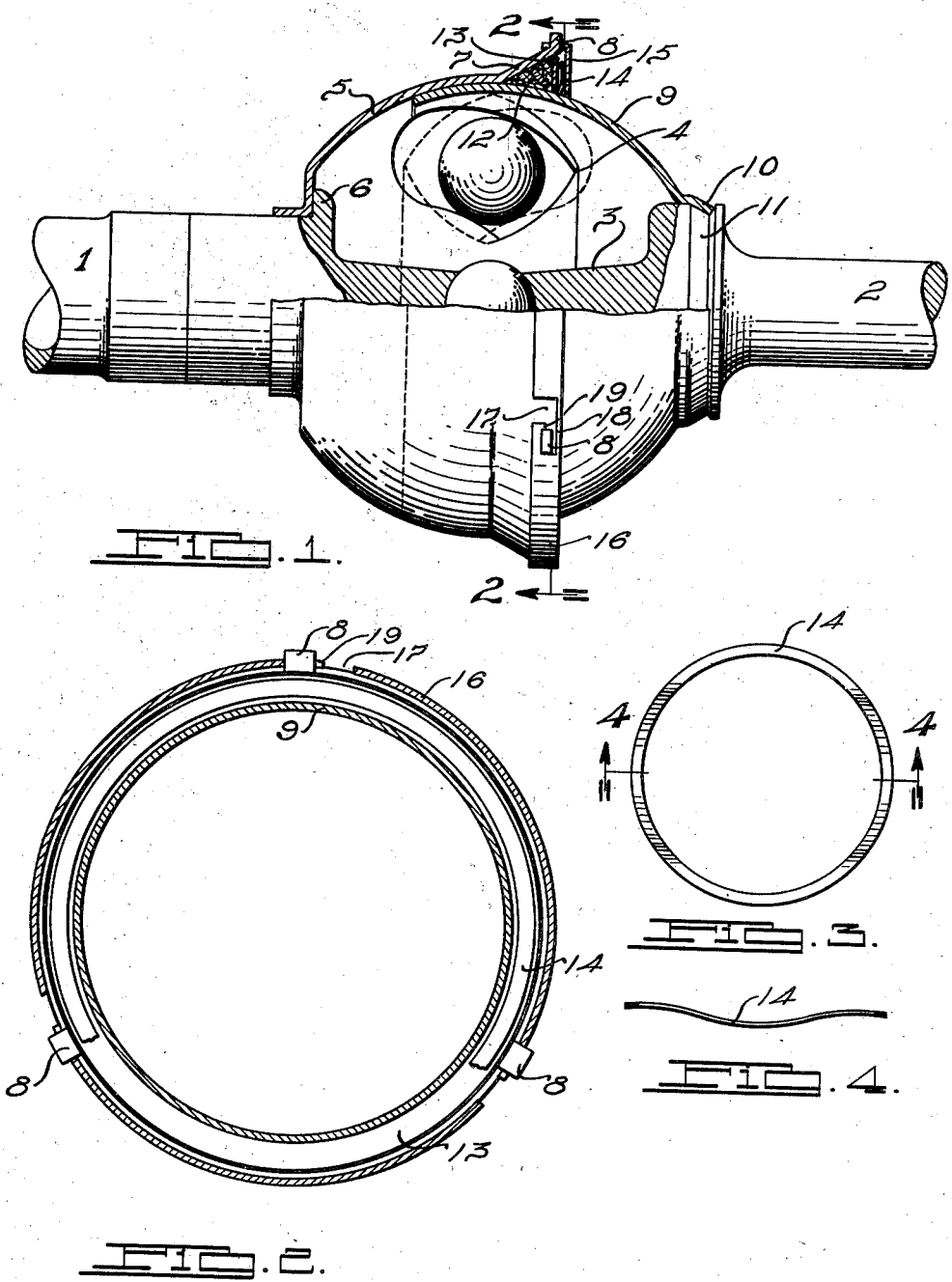
INVENTOR.
Victor E. Nelson.
BY
ATTORNEY.

Patented Mar. 23, 1937

2,074,703

UNITED STATES PATENT OFFICE 2,074,703

CASING FOR UNIVERSAL JOINTS

Victor E. Nelson, Pontiac, Mich.

Application September 15, 1934, Serial No. 744,223

5 Claims. (Cl. 64—32)

This invention relates to casings for universal joints and oil sealing or packing means between the telescoping parts of the casing.

In universal joints there is usually provided a casing housing the joint to retain oil or grease for lubrication of the joint and this casing is sometimes of metal and sometimes formed of what is termed a "leather boot" which soon wears out and permits the oil to throw out of the casing by centrifugal force. My invention is directed to a sheet metal shell of two semi-spherical parts in a nested relation so that the one may turn in the other as a ball in its socket and the invention particularly resides in the formation of these parts whereby one of the same is formed with a flange and provided with a detachable ring and a spring supported by the ring and exerting pressure upon a packing at the interstice between the two half parts of the casing.

These and other objects and various novel features of the invention are hereinafter more fully described and claimed, and the preferred form of construction of a casing for a universal joint and packing means therefor is shown in the accompanying drawing in which—

Fig. 1 is a side elevation partly in section showing my improved casing and packing means applied to a universal joint.

Fig. 2 is a section taken on line 2—2 of Fig. 1.

Fig. 3 is a plan view of the preferred form of spring element.

Fig. 4 is a section thereof taken on line 4—4 of Fig. 3.

The invention herein disclosed is not directed to the particular structure of the joint between the two parts of a shaft, such as is indicated at 1 and 2 in Fig. 1. Ordinarily there is a yoke of some form between the shaft parts, portions of which are indicated at 3 and 4 permitting the axis of the shaft parts 1 and 2 to lie at an angle one to the other, the driving portion of which revolves the driven portion irrespective of change in the angular relationship thereof. Insofar as the invention herein disclosed is concerned, any of the various universal joints for connecting such shaft parts may be utilized.

The invention is embodied in the casing forming the housing for the universal joint connection between the two shafts. In my improved construction the portion 5 or half shell of the casing is mounted on the shaft 1 and against a flange 6 and is intended to revolve with the shaft portion 1 and flange. This shell 5 has between its hub and edge a semi-spherical portion and the edge is out-turned at 7 at a sharp angle to the axis of the shaft part 1 and the terminal end 8 thereof is outturned at a right angle to the axis of said shaft portion. The other half shell 9 of the casing has a spherical outer surface and extends into and is in engagement with the similar spherical portion of the shell 5. There is a comparatively close fit between these spherical surfaces of the two half shells which are concentric being struck from the same axis.

The shell part 9 has a hub portion 10 inturned into a groove 11 formed on an enlarged portion of the shaft 2 and preferably is so fixed in position as to rotate with the shaft portion 2. Such universal joints as are here described are often used as propeller shafts for automotive vehicles where there is practically constant change in the angularity of one shaft portion to the other and may be used wherever universal joints are required to be utilized.

Although the semi-spherical shells 5 and 9 are a sliding fit one within the other in what may be termed "ball and socket" relation, there is a possibility of oil leaking to the exterior of the shell through the interstice therebetween. To prevent such leakage, I provide a triangularly shaped packing ring 12 of cork or other adaptable material one face of which engages the inner face of the angular flange 7 and a second face of which engages the spherical outer surface of the shell 9. It is desired to continually press the packing ring 12 in place to seal the interstice. For this purpose I provide on the third side of the ring an annular washer 13 which is pressed as by a spring 14 against the packing 12 thereby forcing the packing to sealing contact with the respective shell surfaces. The spring 14 is preferably of wave form as will be understood from Figs. 3 and 4 and seats against a retainer cup 15 which is L-shaped in cross section having a peripheral flange 16 attached to a radial body portion as will be understood from the section thereof shown in Fig. 1.

There are at least three radial lugs 8 on the angularly disposed flange 7 of the part 5 and the flange 16 of the retainer cup 15 has bayonet slots therein by means of which the cup may be set over the lugs 8 and then turned so that the lugs engage in the portion 18 of the slot at a right angle to the portion 17 thereof. The portion 18 of the slot is somewhat wider at its extremity than at the point of connection with the slot portion 17 thus providing a little inwardly projecting lug 19. Thus when this retainer ring is placed over the lugs and then turned so that the lugs 8 rest in the portion 18 of the bayonet slot and then released from pressure the spring 14 tends to move the retainer cup 15 to the right of Fig. 1 thus forcing the lug 19 of the bayonet slot over the edge of the lug which prevents a reverse turning of the retainer ring and accidental release thereof from its operative position. The spring thus not only functions to force the packing ring in place in the interstice between the two semi-spherical shells but holds the retainer cup in locked position in respect the lugs 8.

It will be noted that the retainer cup is carried by the half shell 5 of the casing and is unattached to and out of contact with the outer surface of the shell part 9. Thus these parts 5 and 9 of the casing are free to turn relative one to the other and the packing ring 12 is in contact with the inner face of the portion 7 of the shell 5 and the outer face of the shell 9.

The ring 12 will usually rotate with the outer shell in and respect to the inner shell due to the surface thereof in contact with the portion 7 of the shell 5 being greater in area than the surface in contact with the shell 9. It is not essential however with which of the half shell portions the packing ring rotates.

By the construction described, it will be evident that through use of the two sheet metal semi-spherical shell parts in the ball and socket relationship forming a casing together with the formation of the outer shell 5 providing a recess between the casing parts for a packing ring and the carrying of a retainer ring, the relationship of the packing, retainer and spring is undisturbed through revolution of the parts or relative change of angularity of one of the half shells to the other and at all times provides an efficient sealing of the interstice between the two sheet metal shell parts; that the structure is simple and of inexpensive form, is readily detached if the packing becomes worn to permit insertion of a new packing ring. The two semi-spherical members are of integral form or one piece construction and as will be noted in Fig. 1, the flange 7 rises from the edge of the outer member at its point of full diameter and, as before stated, forms a V-shaped recess between the flange and the inner member to receive the packing elements. This construction permits the introduction of the inner member 9 into the outer member 5 as the inner diameter of the outer member at the point from which the flange 7 rises is practically equal to the outer diameter of the inner member. Thus these two semi-spherical members may be assembled by simply moving the inner member into the outer along a straight line passing an extension of the axis of the shaft part of the inner member in any of the angular relationships of the shaft parts. Many previous casings have an outer member built up of more than one piece and the opening of the outer shell is less than the outer diameter of the inner shell. Thus such previous casings require the outer shell to be formed of an attached part at the open end in order that the inner shell can be removed therefrom. Such attached part not only is expensive to construct in comparison to my improved casing but has the further fault of limiting the relative rotative movement of the semi-spherical members to a degree less than is possible with my improved construction. Further, it is pointed out that in universal joints of this general character there is a separating strain imposed upon the two parts of the universal joint and in former constructions this stress is transmitted to the semi-spherical members due to the impossibility of their being separated in the manner provided for in my improved construction. My construction therefore relieves the casing of these separating strains incident to the operation of the encased joint.

Having thus briefly described my invention, its utility and mode of operation, what I claim and desire to secure by Letters Patent of the United States is—

1. A casing for a universal coupling between two shaft parts comprising a pair of semi-spherical sheet metal members each attached to one of the shaft parts and extending toward the other part to beyond the center plane of the coupling, one of the said semi-spherical parts being nested within the other in a ball and socket relationship and being open ended whereby the shaft parts may assume angular relationship within the limits of the diameter of the open ends, the outer of said members having an outwardly extended flange, a packing ring of triangular construction, one face of which engages the outer surface of the inner semi-spherical member and another face engaging the said flange of the outer member, a flat metal ring engaging the third face of the ring, a metal retainer element carried by the flange of the outer member, and spring means between said element and the metal ring.

2. A casing for a universal coupling between two shaft parts comprising a pair of semi-spherical sheet metal members each attached to one of the parts and extending one into the other part in a ball and socket relationship, each of the members extending respectively in overlapping relation practically equi-distantly beyond the center plane of the coupling, the outer of said semi-spherical members having an outwardly extending peripheral flange to form with the other members a V shaped recess, a packing ring of triangular cross section in the said V shaped space, a sheet metal ring attached to the outer edge of the outer members and having a central opening of approximately the diameter of the opening of the inner members in an equi-distantly spaced relation with the center plane of the coupling, the said opening permitting a maximum angular relationship of the parts, a ring like washer, one face of the triangular packing ring engaging the outer surface of the inner semi-spherical member and an opposite face engaging the flange of the outer member, and the third face being engaged by the said ring like member, and spring means between the sheet metal ring and the washer for maintaining the packing in pressure engagement with the two semi-spherical sheet metal members and preventing leakage of oil therebetween.

3. A casing for a universal coupling between two shaft parts comprising a pair of semi-spherical sheet metal members each having a hub for attachment to one of the respective shaft parts and extending one into the other in a ball and socket relationship, each of the members having an open end, the diameter of the open end of the outer member at its point of contact with the inner member being approximately the same as the outer diameter of the inner member, a flange extending outwardly in inclined relation to the said open end of the outer member forming with the inner member a V shaped recess, a packing ring of triangular cross section in the said V shaped space, a metal ring having bayonet slots, lugs extending outwardly from the flange of the outer member for engagement in the slots and the slots having a shoulder formed therein behind which the lugs engage when the parts are in assembled relation, and spring means between the ring and the packing tending to force the packing in place and to hold the lugs in position to engage the notch in the slot thereof to thereby prevent rotation of the metal ring in relation to the flange.

4. A casing for a universal coupling between two shaft parts comprising two open ended semi-spherical sheet metal members in a ball and socket relationship, each of a one-piece construction, the two members having hubs connected with the respective shaft parts, and said shaft parts being united by a universal joint within the casing, the outer of said casing members having an outwardly inclined flange at the open end thereof and the diameter of the said open end being approximately the same as the greatest diameter of the inner casing, said inner casing member being greater than a hemisphere and having an open end of less diameter than the said open end of the outer member permitting the inner member to be introduced into the outer member on a straight line extending through the axis of the shaft part supporting the inner member in any of its operative angular positions in respect to the shaft part, and a packing ring spring-supported in the space between the inner face of the flange of the outer member and the outer face of the inner member, the arrangement providing a universal coupling in which the semi-spherical casing members may separate due to the separating strains imposed on the encased joint in use subject only to the restraint of the spring-pressed packing.

5. A casing for a universal coupling between two shaft parts comprising two open ended semi-spherical members in a ball and socket relationship, said members being centrally connected to the respective shaft parts and the said shaft parts being united by a universal joint within the casing, the outer semi-spherical member having an open end of an inner diameter approximately the same as the greatest diameter of the inner member permitting the inner member to be introduced into the outer member by movement on the extended axis of the shaft part companion to the inner member in any of its operative angular positions in respect to the shaft part companion to the outer member, and means for preventing leakage of lubricant between the two semi-spherical members, the arrangement providing a universal coupling in which the semi-spherical casing members are free to separate under influence of the separting strains imposed on the encased joint in use subject only to the possible restraint of the leak preventing means.

VICTOR E. NELSON.